United States Patent
Groenteman

Patent Number: 5,822,221
Date of Patent: Oct. 13, 1998

[54] OFFICE MACHINE MONITORING DEVICE

[76] Inventor: Frank S. Groenteman, 3304 Cornell Ave., Dallas, Tex. 75205

[21] Appl. No.: 760,389

[22] Filed: Dec. 4, 1996

[51] Int. Cl.⁶ .................................................. G01B 17/00
[52] U.S. Cl. .............................................. 364/550; 399/8
[58] Field of Search ............................ 364/550; 355/308, 355/14, 704, 207; 340/825.17; 375/200; 399/8, 81

[56] References Cited

U.S. PATENT DOCUMENTS

| | | | |
|---|---|---|---|
| 4,167,322 | 9/1979 | Yano et al. | 355/3 R |
| 4,497,037 | 1/1985 | Kato et al. | 364/900 |
| 4,583,834 | 4/1986 | Seko et al. | 355/14 C |
| 4,965,676 | 10/1990 | Ejiri et al. | 358/406 |
| 4,975,926 | 12/1990 | Knapp | 375/1 |
| 4,999,672 | 3/1991 | Rice, Jr. et al. | 355/202 |
| 5,005,183 | 4/1991 | Carey et al. | 375/1 |
| 5,016,059 | 5/1991 | Smeiman | 355/308 |
| 5,046,066 | 9/1991 | Messenger | 370/94.1 |
| 5,057,866 | 10/1991 | Hill, Jr. et al. | 355/200 |
| 5,077,582 | 12/1991 | Kravette et al. | 355/206 |
| 5,084,875 | 1/1992 | Weinberger et al. | 371/291 |
| 5,164,767 | 11/1992 | Suzuki | 355/200 |
| 5,214,772 | 5/1993 | Weinberger et al. | 395/575 |
| 5,220,380 | 6/1993 | Hirata et al. | 355/204 |
| 5,231,646 | 7/1993 | Heath et al. | 375/1 |
| 5,282,127 | 1/1994 | Mii | 364/130 |
| 5,293,196 | 3/1994 | Kaneko et al. | 355/200 |
| 5,398,257 | 3/1995 | Groenteman | 375/200 |

*Primary Examiner*—James P. Trammell
*Attorney, Agent, or Firm*—Baker & Botts, L.L.P.

[57] ABSTRACT

An office machine monitoring device (31) includes an interface unit (32) that couples to a main logic board (50) and a front panel display circuit (52) of an office machine (30). The interface unit (32) intercepts data exchanged between the main logic board (50) and the front panel display circuit (52). The interface unit (32) provides the intercepted data to a microcontroller unit (34) for processing. The microcontroller unit (34) processes the intercepted data and provides a wireless message to a transceiver unit (36). The transceiver unit (36) transmits the wireless message to a supervisory transceiver base unit (28) to allow for remote monitoring and control of the office machine (30).

12 Claims, 2 Drawing Sheets

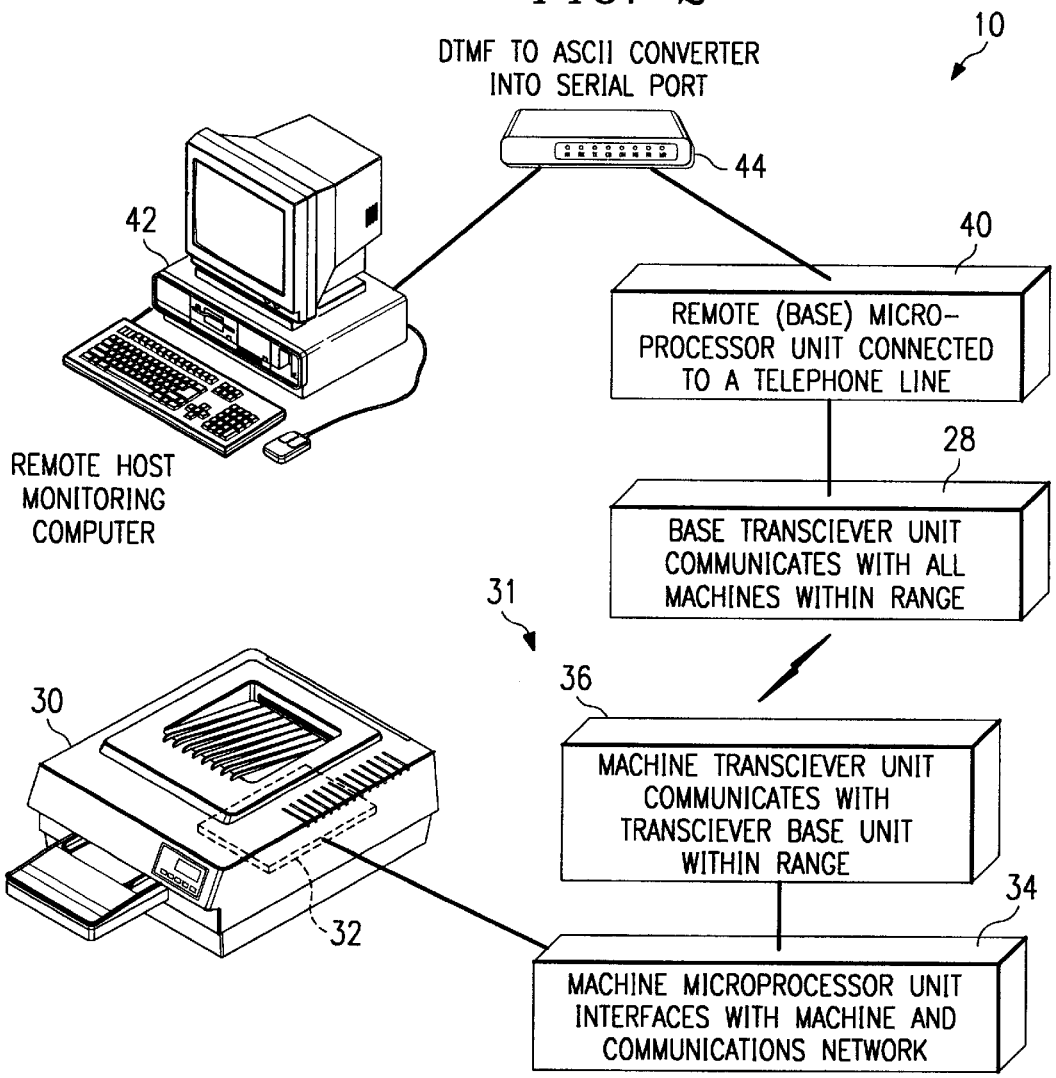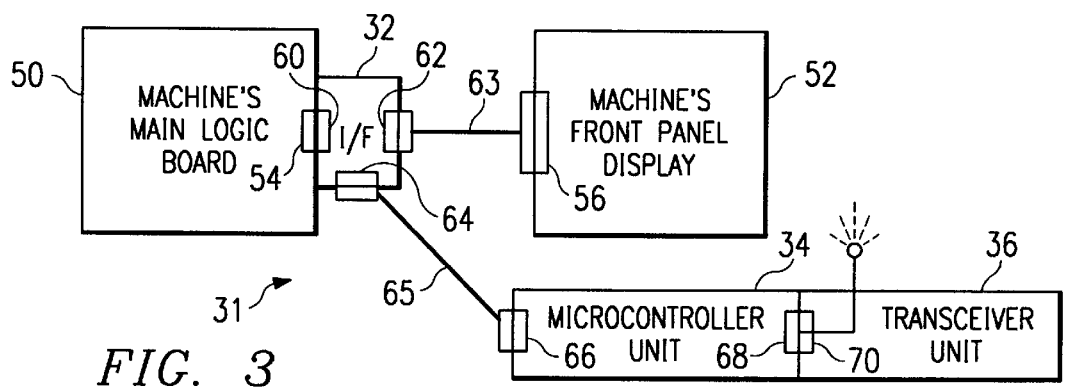

OFFICE MACHINE MONITORING DEVICE

TECHNICAL FIELD OF THE INVENTION

The present invention relates in general to office machine maintenance techniques and more particularly to an office machine monitoring device.

BACKGROUND OF THE INVENTION

Office machine products such as laser printers copiers and computers are well known in the art. These office machines generate status information that typically can be monitored manually or through connection to a computer, either directly or indirectly over telephone line communications. However, these monitoring techniques are not economically justifiable for the office machine maintenance industry because of the costs involved in sending a maintenance person to monitor the office machine or in establishing a computer monitoring station with telephone line access. Therefore, it is desirable to have a maintenance technique that monitors office machine status without personal attention or expensive computer and telecommunications attachments.

SUMMARY OF THE INVENTION

From the foregoing, it may be appreciated that a need has arisen for a technique to monitor office machines in an efficient and inexpensive manner. In accordance with the present invention, an office machine monitoring device is provided that substantially eliminates or reduces disadvantages and problems associated with conventional monitoring techniques.

According to an embodiment of the present invention, there is provided an office machine monitoring device that includes an interface circuit coupled to the logic circuit and the display circuit of the office machine. The interface circuit intercepts data from the logic circuit of the office machine while allowing the display circuit of the office machine to receive the data. The data intercepted by the interface board is processed by a microcontroller unit, placed into a wireless message format, and sent to a monitoring base through a wireless transceiver unit.

The present invention provides various technical advantages over conventional monitoring techniques. For example, one technical advantage is to have an interface unit within the office machine to intercept data without affecting the operation of the office machine. Another technical advantage is to provide monitoring of office machines without performing manual checks or establishing expensive communication links. Other technical advantages are readily apparent to one skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

FIG. 2 illustrates operation of an office machine monitoring device within the office machine monitoring network;

FIG. 3 illustrates the office machine monitoring device connected within an office machine.

DETAILED DESCRIPTION OF THE INVENTION

Figure 1:
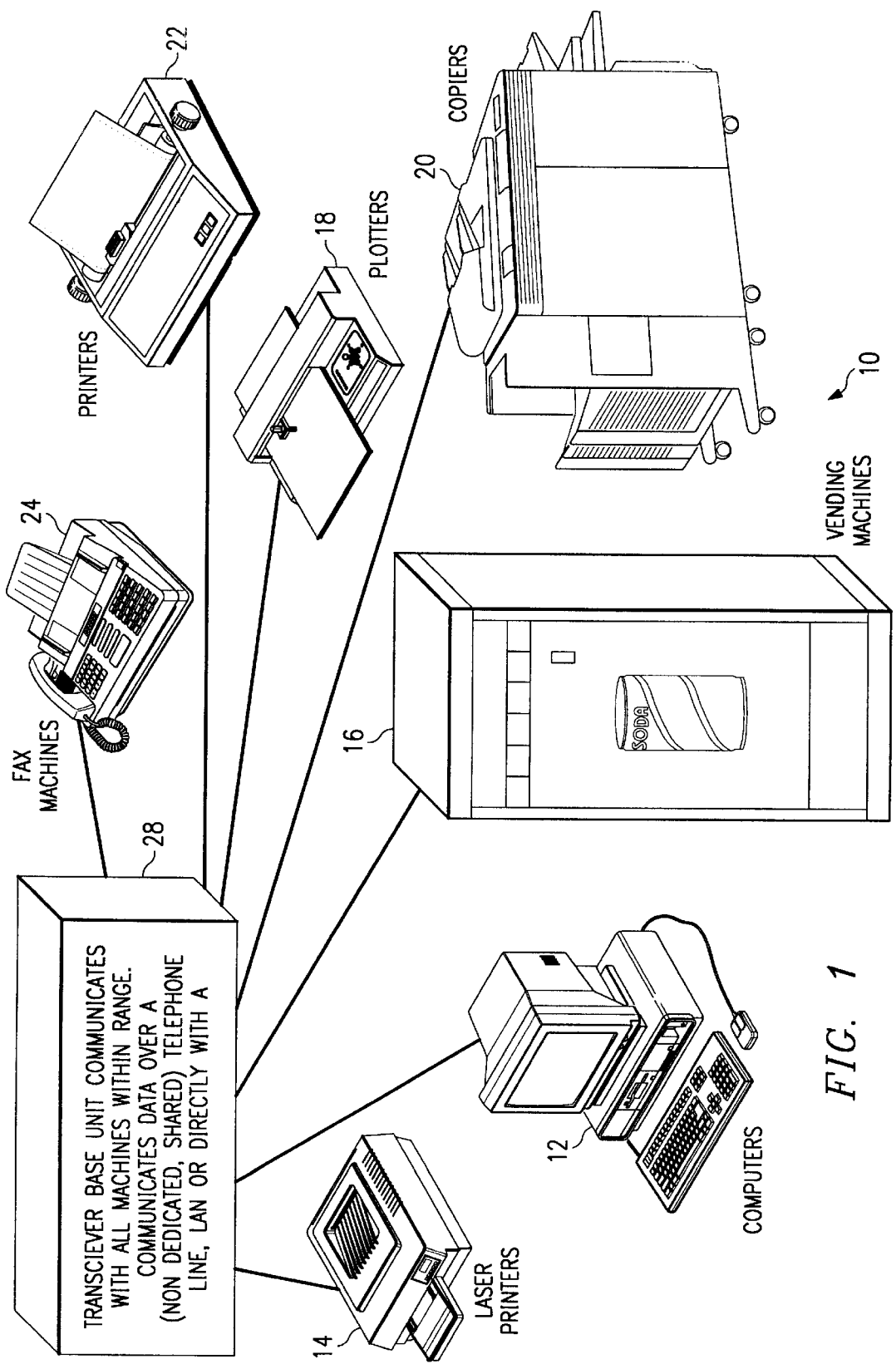
FIG. 1 illustrates a block diagram of an office machine monitoring network.

FIG. 1 is a block diagram of an office machine monitoring network 10. Office machine monitoring network 10 may be established in a similar manner as the copier monitoring network disclosed in U.S. Pat. No. 5,398,257 issued on Mar. 14, 1995 to Groenteman and incorporated herein by reference. Office machine monitoring network 10 provides the capability to perform status and alarm communications with a variety of office machines to include computers 12, laser printers 14, vending machines 16, plotters 18, copiers 20, other printers 22, and fax machines 24. Though not shown, other office machines that may be also included in office machine monitoring network 10 are file servers, cash machines, debit card machines, and coin machines. All office machines within a range of coverage communicate with a supervisory transceiver base unit 28 to provide status and alarm information and receive operating and control information.

FIG. 2 shows the operation of office machine monitoring network 10 with respect to a single office machine 30. An office machine monitoring device 31 coupled to an office machine 30, such as a printer, includes an interface unit 32, a microcontroller unit 34, and a transceiver unit 36. Interface unit 32, microcontroller unit 34, and transceiver unit 36 may be configured on a single board or separate boards, and may be located internal to office machine 30 or external to office machine 30. Interface board 32 provides the data handshaking functionality to retrieve status and alarm information from and provide operation and control information to office machine 30. Interface unit 32 may be coupled between a display cable connector and a main logic board connector of office machine 30. Interface unit 32 allows data to be sent to a display unit of office machine 30 while also capturing that data for transfer to microcontroller unit 34. FIG. 3 shows a schematic circuit diagram of interface unit 32 for a laser printer.

Microcontroller unit 34 monitors the data transferred to the display unit of office machine 30. When an appropriate data signal is identified by microcontroller unit 34, microcontroller unit 34 initiates the transmission of the corresponding alarm and status information. Microcontroller unit 34 can analyze analog or digital signals generated by office machine 30, such as metering signals identifying page/unit counts for inventory, machine signals identifying alarms, security breaches, and service requests, and status signals identifying operating temperatures and physical configurations. The analog and digital signals identified above are not an exhaustive list as microcontroller unit 34 can analyze all operational characteristics of office machine 30.

Transceiver unit 36 receives alarm and status information from microcontroller unit 34 for wireless transmission to a supervisory transceiver base unit 28 within office machine monitoring network 10. Transceiver unit 36 may provide data transmission to supervisory transceiver base unit 28 over any number of frequencies, including radio, and may employ any variety of communication techniques, including spread spectrum and encryption. An example of a frequency used by transceiver unit 36 may include 913.5 MHz to avoid the user to require an FCC license.

Supervisory transceiver base unit 28 receives alarm and status information transmitted by transceiver unit 36 for processing by a base microprocessor unit 40. Base microprocessor unit 40 handles any type of office machine within range of supervisory transceiver base unit 28. Base microprocessor unit 40 processes the alarm and status information and transfers the processed alarm and status information to a remote host monitoring computer 42 either directly, by a non-dedicated shared telephone line connection, or through a local area network. For communication over a telephone line connection, a DTMF to ASCII converter 44 provides the interface between the touch tone signaling of base microprocessor unit 40 and the ASCII protocol of remote host monitoring computer 42. Remote host monitoring computer 42 performs the monitoring function on the alarm and status information of office machine 30. Remote host monitoring computer 42 may provide management reporting capabilities in response to the alarm and status information. Remote host monitoring computer 42 may also generate correction, adjustment, and control data for communication back to office machine 30.

FIG. 3 shows how office machine monitoring device 31 is connected to office machine 30. Office machine 30 includes a main logic board 50 and a front panel display circuit 52. Typically, office machine 30 has a cable or other connecting apparatus extending between a display connection 54 of main logic board 50 and a logic board connection 56 of front panel display circuit 52 for data exchange such that status information can be displayed and to allow for control information to be returned from front panel inputs. Office machine monitoring device 31 is inserted into office machine 30 by coupling display connection 54 of main logic board 50 with an interface logic connection 60 of interface unit 32. Interface unit 32 includes an interface display connection 62 that couples to logic board connection 56 of front panel display circuit 52 by a display cable 63. Interface unit 32 also includes a microcontroller connection 64 to couple interface unit 32 with microcontroller unit 34 at an interface connection 66 by an interface cable 65.

Through coupling with main logic board 50 and front panel display circuit 52 of office machine 30, interface unit 32 can intercept status and control data transferred between main logic board 50 and front panel display circuit 52. Interface unit 32 provides this data interception capability without affecting data exchange and transfer between main logic board 50 and front panel display circuit 52. Data intercepted by interface unit 32 is transferred through microcontroller connection 64 and interface connection 66 to microcontroller unit 34. After processing, microcontroller unit 34 provides transceiver unit 36 with a wireless message through a transceiver connection 68 and a message connection 70 for wireless transmission to supervisory transceiver base unit 28.

Thus, it is apparent that there has been provided, in accordance with the present invention, an office machine monitoring device that satisfies the advantages set forth above. Although the present invention has been described in detail, it should be understood that various changes, substitutions, and alterations can be made herein. For example, though cable connections are shown and discussed, the interface unit of the office machine monitoring device may couple to the main logic board and the front panel display of the office machine through any conventional connection techniques. Other examples are readily ascertainable to one skilled in the art and can be made without departing from the spirit and scope of the present invention as defined by the following claims.

What is claimed is:

1. A device for monitoring an office machine, comprising:
   an interface unit coupled to a main logic board and a display circuit of the office machine, the interface unit being directly connected to the main logic board to receive data generated by the main logic board, the interface unit providing the data to the display circuit;
   a microcontroller unit operable to process the data provided by the interface unit; and
   a transceiver unit operable to transmit the data processed by the microcontroller unit through a wireless transmission technique.

2. The device of claim 1, wherein the interface unit intercepts the data without affecting communications between the main logic board and the display circuit.

3. The device of claim 1, wherein the interface unit connects to a display connection of the main logic board and couples to a logic board connection of the display circuit through a display cable.

4. The device of claim 1, wherein the interface unit is inserted between the display connection of the main logic board and an existing display cable of the office machine extending to the display circuit.

5. The device of claim 1, wherein the office machine is a laser printer.

6. The device of claim 1, wherein the transceiver unit operates at a frequency of 913.5 MHz.

7. A system for monitoring an office machine, comprising:
   an office machine monitoring device coupled to the office machine, the office machine monitoring device including:
      an interface unit coupled to a main logic board and a display circuit of the office machine, the interface unit being directly connected to the main logic board to receive data generated by the main logic board, the interface unit providing the data to the display circuit;
      a microcontroller unit operable to process the data received by the interface unit;
      a transceiver unit operable to transmit the data processed by the microcontroller unit through a wireless transmission technique;
   a supervisory transceiver base unit operable to receive the data transmitted by the transmitter unit; and
   a base microprocessor unit operable to process the data received by the supervisory transceiver base unit.

8. The system of claim 7, further comprising:
   a monitoring computer operable to record the data processed by the base microprocessor unit.

9. The system of claim 8, wherein the microprocessor unit sends processed data to the monitoring computer through a DTMF to ASCII converter.

10. The system of claim 8, wherein the monitoring computer is operable to generate control messages for transmission to the office machine, the control messages providing operational instructions for the office machine.

11. The system of claim 7, wherein the office machine is a laser printer.

12. The system of claim 7, wherein the transceiver unit and the supervisory transceiver base unit exchange messages at a frequency of 913.5 MHz.

* * * * *